(12) United States Patent
Stauffer

(10) Patent No.: US 8,601,902 B2
(45) Date of Patent: Dec. 10, 2013

(54) STEERING WHEEL ADJUSTMENT AND SECUREMENT MECHANISM

(75) Inventor: Eric Lee Stauffer, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 279 days.

(21) Appl. No.: 12/831,776

(22) Filed: Jul. 7, 2010

(65) Prior Publication Data

US 2012/0006141 A1   Jan. 12, 2012

(51) Int. Cl.
*B62D 1/18*   (2006.01)
*B62D 1/16*   (2006.01)

(52) U.S. Cl.
USPC .............................................. 74/493; 74/495

(58) Field of Classification Search
USPC .............................. 74/493, 495, 552; 280/775
See application file for complete search history.

(56) References Cited

U.S. PATENT DOCUMENTS

| | | | | |
|---|---|---|---|---|
| 1,703,485 A * | 2/1929 | Hughes | ........................... | 74/493 |
| 3,773,137 A * | 11/1973 | Escudero | ...................... | 180/271 |
| 4,347,757 A * | 9/1982 | Martin | ............................ | 74/493 |
| 4,402,236 A * | 9/1983 | Nishikawa | ...................... | 74/493 |
| 4,463,625 A * | 8/1984 | Nishikawa | ...................... | 74/493 |
| 4,516,440 A | 5/1985 | Nishikawa | ...................... | 74/493 |
| 4,541,299 A * | 9/1985 | Kanaya et al. | .................. | 74/493 |
| 4,572,023 A * | 2/1986 | Euler | .............................. | 74/493 |
| 4,901,593 A | 2/1990 | Ishikawa | ........................ | 74/493 |
| 5,071,163 A * | 12/1991 | Heinrichs et al. | ............. | 280/775 |
| 5,103,660 A * | 4/1992 | Johnson | .......................... | 70/209 |
| 7,322,608 B2 | 1/2008 | Yamamoto | ..................... | 280/775 |
| 7,552,946 B2 * | 6/2009 | Kuerschner et al. | .......... | 280/779 |
| 2007/0039402 A1 * | 2/2007 | Hebenstreit et al. | ............ | 74/492 |

* cited by examiner

*Primary Examiner* — Justin Krause
(74) *Attorney, Agent, or Firm* — L.C. Begin & Associates, PLLC

(57) ABSTRACT

A steering wheel adjustment and securement mechanism is provided including a tube coupled to a steering shaft such that the shaft rotates in correspondence with the tube, and a collar slidably mounted to the tube, the collar being coupled to the tube such that the tube rotates in correspondence with the collar.

18 Claims, 2 Drawing Sheets

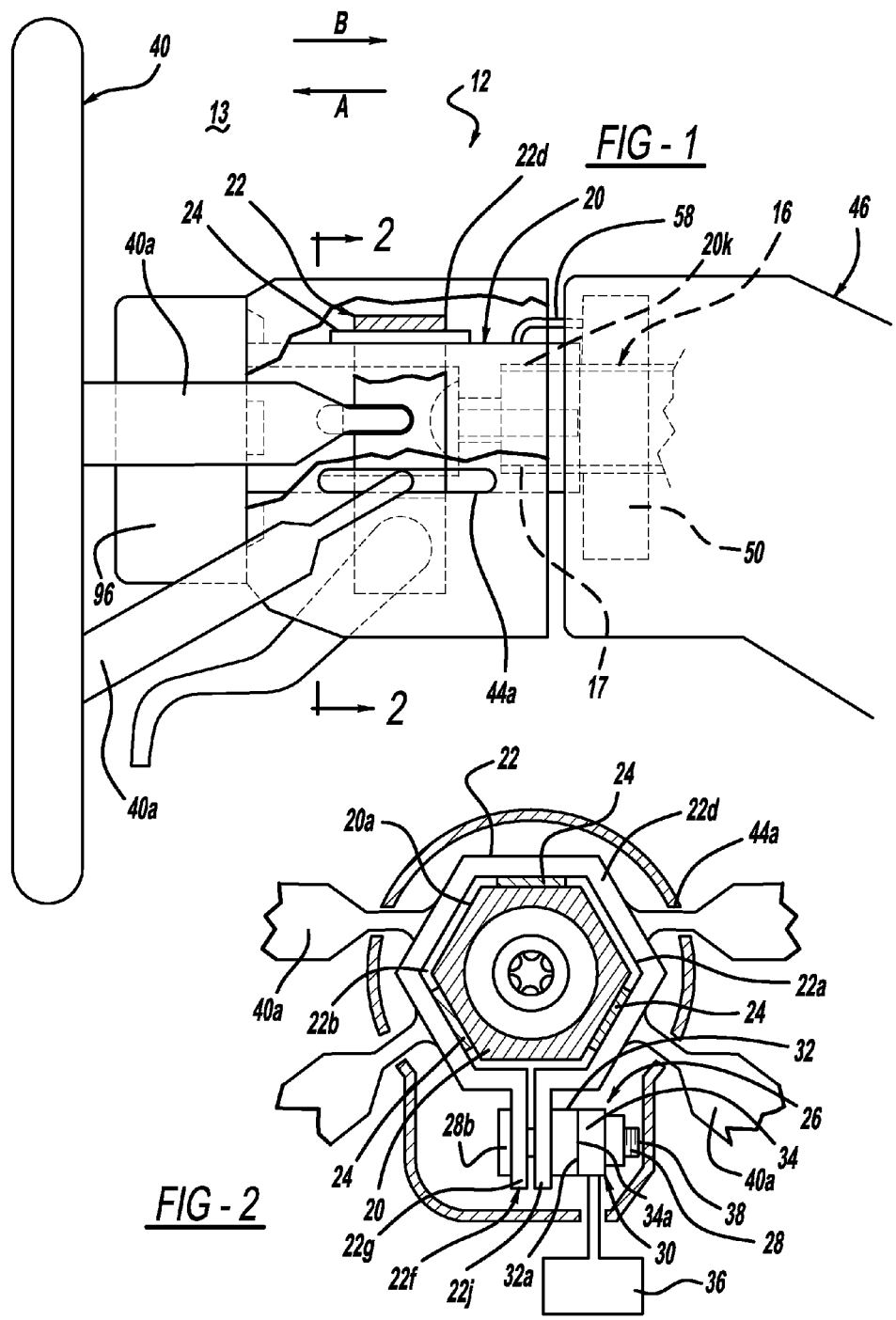

STEERING WHEEL ADJUSTMENT AND SECUREMENT MECHANISM

BACKGROUND OF THE INVENTION

The embodiments of the present invention relates to mechanisms for facilitating adjustment of the position of a vehicle steering wheel relative to a driver of the vehicle.

SUMMARY OF THE INVENTION

In one aspect of the embodiments of the present invention, a steering wheel adjustment and securement mechanism is provided including a tube coupled to a steering shaft such that the shaft rotates in correspondence with the tube, and a collar slidably mounted to the tube, the collar being coupled to the tube such that the tube rotates in correspondence with the collar.

In another aspect of the embodiments of the present invention, a steering wheel adjustment and securement mechanism is provided including a tube rotationally coupled to a steering shaft so as to prevent motion of the tube parallel to an axis of the shaft, and a collar rotationally coupled to the tube so as to permit motion of the collar parallel to the axis of the shaft.

In another aspect of the embodiments of the present invention, a steering wheel assembly is provided including a collar configured for rotational coupling to a steering shaft of a vehicle so as to permit motion of the collar parallel to the axis of the shaft, and a steering wheel coupled to the collar such that the collar rotates in correspondence with the wheel.

BRIEF DESCRIPTION OF THE DRAWINGS

In the drawings illustrating embodiments of the present invention:

FIG. 1 is a partially cutaway side view of a portion of a steering column assembly incorporating a steering wheel adjustment and securement mechanism in accordance with one embodiment of the present invention.

FIG. 2 is a cross-sectional end view of the embodiment shown in FIG. 1.

DETAILED DESCRIPTION

Figure 3:
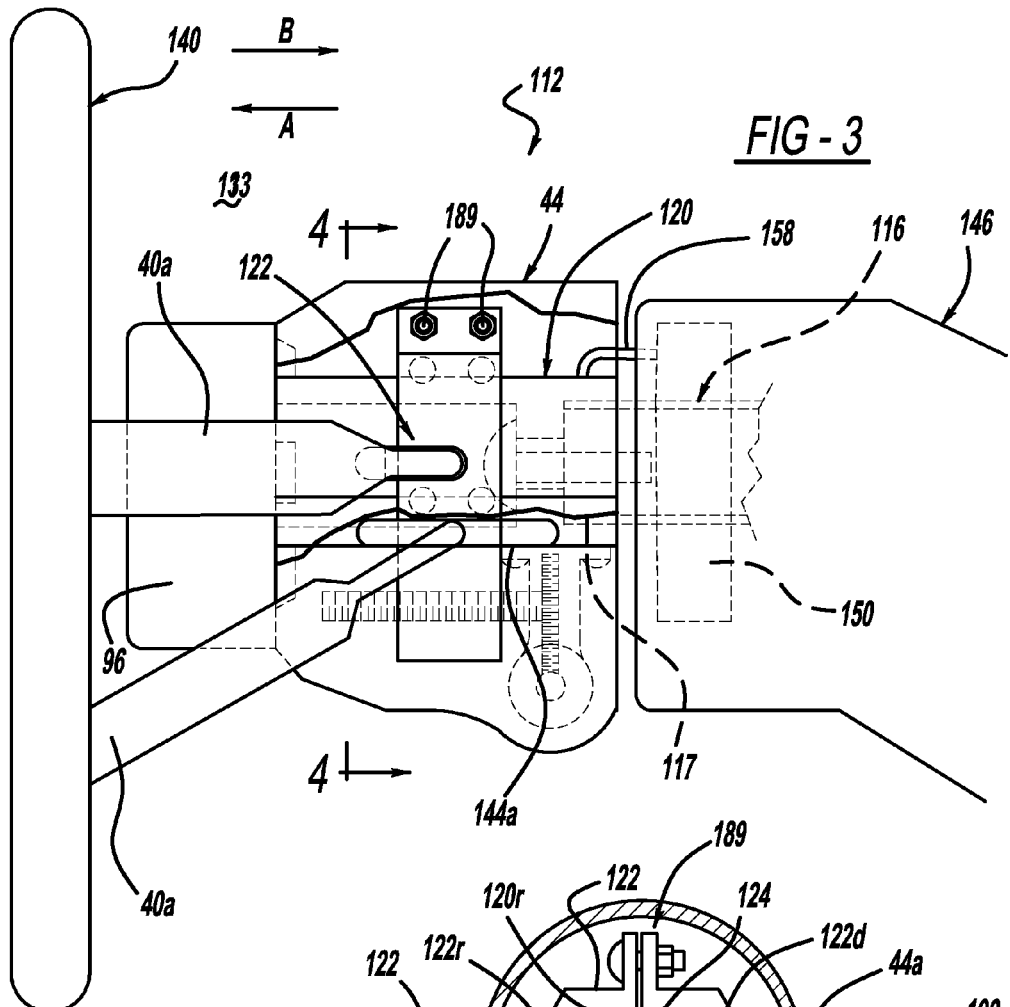
FIG. 3 is a partially cutaway side view of a portion of a steering column assembly in accordance with another embodiment of the present invention.

Like reference numerals refer to like elements throughout the following detailed description.

FIGS. 1 and 2 show a portion of a steering column assembly 13 incorporating a steering wheel adjustment and securement mechanism 12 in accordance with one embodiment of the present invention. In the embodiment shown in FIGS. 1 and 2, the wheel adjustment and securement mechanism is actuated manually.

As known in the art, the steering column assembly is generally arranged between a steering wheel 40 and a universal joint (not shown) that is further connected to a steering mechanism (not shown) for steering the front wheels of the vehicle. A driver steers the vehicle by turning the steering wheel.

In the embodiment shown in FIGS. 1 and 2, the steering column assembly 13 includes a steering shaft 16. Steering shaft 16 couples the steering wheel 40 to the universal joint and the steering mechanism. In the embodiment shown in FIGS. 1 and 2, shaft 16 has a plurality of splines 17 formed along an exterior thereof for engaging complementary slots 20k formed in a cavity of a rear portion of a tube 20 (described below). Positive engagement between splines 17 and slots 20k ensures that shaft 16 will rotate in correspondence with tube 20. Stated another way, tube 20 is rotationally coupled to shaft 16. Elements referred to herein as being "rotationally coupled" are understood to be coupled to each other so as to rotate in correspondence with each other. Methods other than splines may also be used for coupling shaft 16 to tube 20 to ensure rotation of shaft 16 in correspondence with tube 20.

In the embodiment shown in FIGS. 1 and 2, tube 20 encloses at least a portion of steering shaft 16 and is coupled to the steering shaft in a known manner such that a rotation of tube 20 produces a corresponding rotation of the steering shaft as previously described. Tube 20 may have an external shape configured to engage complementary features formed on a body portion 22d of a collar 22 (described below) to facilitate engagement between the tube 20 and collar 22 and rotation of the tube 20 in correspondence with collar 22, and/or to provide spacing between an outer surface 20a of the tube and an inner surface 22a of the collar body portion 22d. In the embodiment shown, tube 20 has a hexagonally-shaped outer surface which fits into a complementarily-shaped inner cavity 22b defined by collar inner surface 22a. However, other shapes of the tube outer surface 20a and the collar inner surface 22a are also possible, depending on the requirements of a particular application. Tube 20 may be bolted (using a bolt 92 as shown in FIGS. 1 and 2) or otherwise suitably attached to shaft 16. Tube 20 may be formed from a metallic material, a polymeric material, or any other suitable material.

Collar 22 is slidingly mounted along tube 20. Collar 22 has a body portion 22d and a securement portion 22f. Collar body portion 22d encloses at least a portion of steering tube 20 and is coupled to the tube, such that a rotation of collar 22 produces a corresponding rotation of the tube 20. Collar body portion 22d may have an internal shape configured to engage complementary features formed along an exterior of tube 20 to facilitate engagement between the tube 20 and collar 22 and rotation of the tube 20 in correspondence with collar 22, and/or to provide spacing between tube outer surface 20a and collar inner surface 22a. In the embodiment shown, collar body portion 22d has a hexagonally-shaped inner surface 22a which forms a hexagonal inner cavity 22b configured for receiving tube outer surface 20a therein. However, other shapes of the tube outer surface 20a and the collar inner surface 22a are also possible, depending on the requirements of a particular application. Collar 22 may be formed from a metallic material or any other suitable material.

In the embodiment shown in FIGS. 1 and 2, collar inner surface 22a is spaced apart from tube outer surface 20a so as to provide sufficient space between the tube and the collar to position a plurality of spacers 24 therebetween. Spacers 24 may be suitably disposed about the tube 20 between inner surface 22a and outer surface 20a to facilitate smooth, low-friction movement sliding movement of collar 22 with respect to tube 20. Spacers 24 may be secured to collar 22, to tube 20, or to both tube 20 and collar 22. In one embodiment, to facilitate smooth, low-friction movement sliding movement of collar 22, spacers 24 are formed from a material having relatively low coefficients of static and dynamic friction with respect to the materials from which tube 20 and/or collar 22 are formed. In a particular embodiment, spacers 24 are formed from a nylon or other suitable polymeric material.

Collar securement portion 22f is configured for mounting of a releasable collar securement or locking mechanism thereon. In the embodiment shown in FIGS. 1 and 2, collar securement portion 22f includes a pair of opposed, spaced-apart flanges 22g and 22j. Flanges 22g and 22j include respective holes (not shown) formed therein for receiving a bolt 28 therethrough. Flanges 22g and 22j are spaced apart and configured (in conjunction with collar body portion 22d) such that, upon release of locking mechanism 26 (described below), flanges 22g and 22j tend to move away from each other to positions wherein a gripping or securement force of the collar 22 on the tube 20 is reduced to a point where a user may slide the collar along the spacers 24. Thus, the collar is biased toward a relatively loose configuration which permits sliding of the collar along tube 20.

In the embodiment shown in FIGS. 1 and 2, a releasable locking mechanism 26 is incorporated coupled to collar 22. Locking mechanism 26 is configured to enable a general loosening and tightening of collar 22 about tube 20. Mechanism 26 includes a bolt 28 with a shank sized to extend through flange holes 22k and 22m, and a head 28b sized to abut flange 22g to prevent passage of the bolt completely through holes 22k and 22m.

A cam mechanism 30 is mounted on bolt 28 for locking collar 22 in a desired position along tube 20, in a manner described below. in the embodiment shown in FIGS. 1 and 2, cam mechanism 30 includes a first cam 32 engaging flange 22j, a second cam 34 engaging first cam 32, a lever 36 connected to second cam 34 so as to enable rotation of the second cam in correspondence with rotation of the lever, and a cam locking member 38 applied to bolt 28 and engaging lever 36 to press second cam 34 against first cam 32. Second cam 34, in turn, presses against first cam 32. First cam 32 is fixed with respect to flange 22j. First and second cams 32 and 34 include surfaces 32a and 34a which face and engage each other.

In a known manner, surfaces 32a and 34a include relatively raised and depressed portions (not shown configured so that rotation of second cam 34 in a first direction with respect to stationary first cam 32 enables movement of first cam 32 along bolt 28 away from bolt head 28b, due to the forces in collar 22 tending to spread flanges 22g and 22j farther apart. In this manner, this rotation of the second cam releases the securement mechanism. This permits flanges 22j and 22g to move away from each other, loosening the collar 22 and permitting the collar to slide along tube 20 in the directions indicated by arrows A and B, via spacers 24.

The raised and depressed portions along cam surfaces 32a and 34a are also configured so, after the collar 22 has been moved along tube 22 to position the attached wheel as desired, rotation of second cam 34 in a second direction opposite the first direction causes movement of first cam along bolt 28 toward bolt head 28b. This forces flange 22j toward flange 22g, thereby tightening the collar about tube 20 and securing the collar in the new position corresponding to the desired position of steering wheel 40. The lever 36 may then be locked in the new rotational position.

Other types of locking mechanisms may also be used.

Steering wheel 40 is suitably connected to collar 22 via conventional spokes or other suitable connecting members 40a such that rotation of wheel 40 produces a corresponding rotation of tube 22.

A wheel shroud 44 covers the portion of tube 20 along which collar 22 is slidably mounted. A plurality of elongated slots 44a is formed in wheel shroud 44. Slots 44a are disposed about the wheel shroud and sized so as to permit connecting members 40a of steering wheel 40 to extend therethrough, from an exterior of the wheel shroud into an interior of the shroud where the spokes are connected to collar 22. Slots are also configured to permit movement of the connecting members 40a along the length thereof, to accommodate positional adjustment of collar 22 and steering wheel 40 attached thereto. Shroud 44 may be formed from a metallic material, a polymeric material, or any other suitable material.

A column shroud 46 covers the portion of steering column forward of wheel shroud 44. this portion of the steering column may house, for example, a clock spring 50 for operatively coupling (via one or more wires 58) the vehicle electrical system to the horn (not shown), airbag system (not shown), and any other electrical devices located within a hollow cover 96 positioned rearward of the portion 12 of the steering column assembly 13, as shown in FIG. 1. Wires 58 may be fed along the steering column assembly between collar 22 and tube 20, or the wires may be fed along the exterior of the collar.

It may be seen from the above description and the attached drawings that the steering shaft 16, the portion of the steering column along which collar 22 is slidably mounted, and the cover 96 housing the driver side airbag and other devices do not move forward or rearward, and also that, in the embodiments of the present invention, these elements do not need to move in order for the wheel position to be adjusted by a driver. In order to reposition the wheel 40 according to driver preference, it is only necessary to release the locking mechanism 26, slide the wheel along tube 20 to the desired position, and actuate the locking mechanism to lock the wheel in the desired position.

Figure 4:
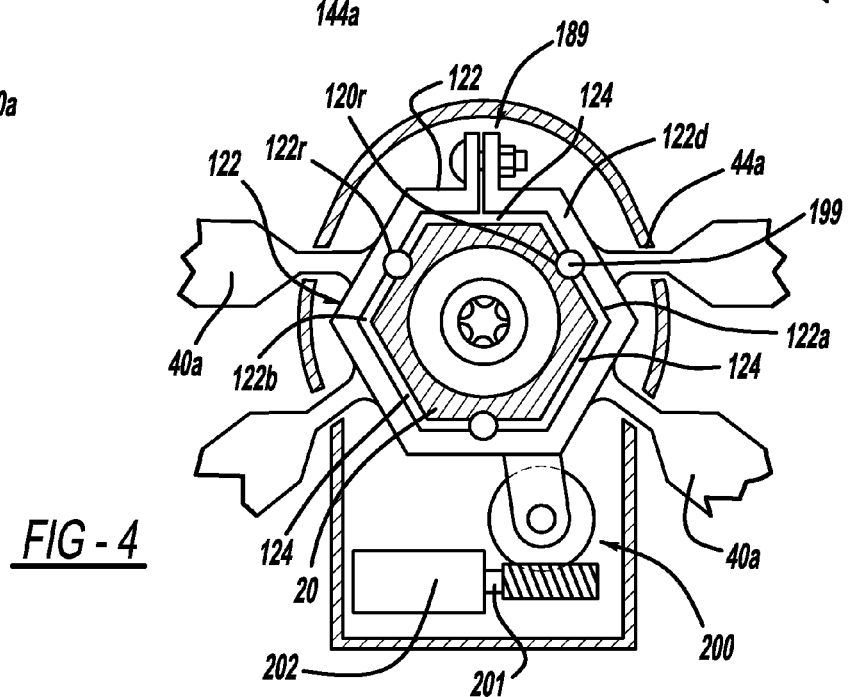
FIG. 4 is a cross-sectional end view of the embodiment shown in FIG. 3.

Referring now to FIGS. 3 and 4, in another embodiment 112 of the portion of a steering column assembly 113, position of the steering wheel 40 is not adjusted manually. Rather, a powered system is used to adjust the position of the steering wheel. The embodiment shown in FIGS. 3 and 4 is substantially the same as the embodiment shown in FIGS. 1 and 2.

The embodiment shown in FIGS. 3 and 4 includes a steering shaft 116 and a tube 120 operatively coupled to the steering shaft such that a rotation of tube 120 produces a corresponding rotation of the steering shaft, as previously described. However, in the embodiment shown in FIGS. 3 and 4, spacers 24 are omitted from between collar 122 and tube 120. Instead, to facilitate low-friction movement of collar 122 relative to tube 120, a series of ball bearings 199 are rollably positioned in opposed races 120r and 122r formed in tube 120 and collar 122, respectively.

In addition, instead of using a manually-actuated locking mechanism 26, flanges 122g and 122j on collar 122 are secured with respect to each other using a bolt assembly 189 or other mechanism suitable for maintaining the flanges in a position in which the tube 120 is securely engaged by collar 122 so as to ensure rotation of tube 120 in correspondence with the collar, and to ensure that the bearings 199 remain positioned in the races.

Collar 122 also has an extension 122e operatively coupled to a gear system 200 or other suitable motion translation mechanism for converting motion of an output shaft 201 of a motor 202 (for example, a servomotor) into motion of collar 122 along tube 120 in the mariner previously described. Motor 202 may be actuated using column-mounted or dashboard-mounted controls (not shown), in a manner known in the art. Actuation of the motor results in powered motion of collar 122 along tube 120, obviating the need to manually reposition the wheel 40. The collar 122 and its attached wheel 40 are locked in position by engagement between the associated gears of the gear system 200.

As set forth above, a steering wheel adjustment and securement mechanism is described including a tube coupled to a steering shaft such that the shaft rotates in correspondence with the tube, and a collar slidably and lockably mounted along the tube, the collar being coupled to the tube such that the tube rotates in correspondence with the collar.

Also, as set forth above, a steering wheel adjustment and securement mechanism is described including a tube rotationally coupled to a steering shaft so as to prevent motion of the tube parallel to an axis of the shaft, and a collar rotationally coupled to the tube so as to permit motion of the collar parallel to the axis of the shaft.

Also, as set forth above, a steering wheel assembly is described including a collar configured for rotational coupling to a steering shaft of a vehicle so as to permit motion of the collar parallel to the axis of the shaft, and a steering wheel coupled to the collar such that the collar rotates in correspondence with the wheel.

It will be understood that the foregoing descriptions of various embodiments of the present invention is for illustrative purposes only. As such, the various structural and operational features herein disclosed are susceptible to a number of modifications, none of which departs from the scope of the present invention as defined in the appended claims.

What is claimed is:

1. A steering wheel adjustment and securement mechanism comprising:
    a tube coupled to a steering shaft such that the shaft rotates in correspondence with the tube; and
    a collar coupled to the tube so as to be movable with respect to the tube and lockable in a plurality of locations with respect to the tube, wherein the collar is spaced apart from the tube when the collar is locked in a given location.

2. The mechanism of claim 1 further comprising a steering wheel attached to the collar such that the collar rotates in correspondence with the wheel.

3. A vehicle steering column including a steering wheel adjustment and securement mechanism in accordance with claim 1.

4. A vehicle including a steering wheel adjustment and securement mechanism in accordance with claim 1.

5. The mechanism of claim 1 wherein the collar is spaced apart from the tube by at least one spacer positioned between the collar and the tube.

6. The mechanism of claim 5 wherein the collar is structured to slide along the at least one spacer when the collar is moved with respect to the tube.

7. The mechanism of claim 1 wherein the collar is spaced apart from the tube by a plurality of ball bearings positioned between the collar and the tube.

8. The mechanism of claim 7 wherein the ball bearings roll along races extending parallel to an axis of movement of the steering wheel.

9. A steering wheel adjustment and securement mechanism comprising:
    a tube operatively coupled to a steering shaft such that the shaft always rotates in correspondence with the tube; and
    a steering wheel operatively coupled to the tube so as to be movable with respect to the tube and the steering shaft and lockable in a plurality of locations along the tube, and such that the tube always rotates in correspondence with the wheel,
    wherein the steering wheel is operatively coupled to the tube by a collar attached to the wheel such that the collar always rotates in correspondence with the wheel, and wherein the collar is operatively coupled to the tube such that the tube always rotates in correspondence with the collar.

10. A vehicle steering column including a steering wheel adjustment and securement mechanism in accordance with claim 9.

11. A vehicle including a steering wheel adjustment and securement mechanism in accordance with claim 9.

12. The mechanism of claim 9 wherein the ball bearings roll along races extending parallel to an axis of movement of the steering wheel.

13. The mechanism of claim 9 wherein the portion of the collar is spaced apart from the tube by at least one spacer positioned between the portion of the collar and the tube.

14. A steering wheel adjustment and securement mechanism comprising:
    a collar operatively coupled to a steering shaft so as to be movable with respect to the shaft and lockable in a plurality of locations with respect to the shaft, and such that the shaft always rotates in correspondence with the collar; and
    a steering wheel directly attached to the collar such that the collar always rotates in correspondence with the wheel.

15. A vehicle steering column including a mechanism in accordance with claim 14.

16. A vehicle including a mechanism in accordance with claim 14.

17. The mechanism of claim 14 wherein the collar is coupled to the shaft using a tube attached to the shaft such that the shaft always rotates in correspondence with the tube, and wherein the collar is mounted on the tube so as to be movable along the tube and such that the tube always rotates in correspondence with the collar.

18. The mechanism of claim 14 wherein the collar is always spaced apart from the tube.

* * * * *